United States Patent [19]

Schuh

[11] Patent Number: 5,112,196

[45] Date of Patent: May 12, 1992

[54] METHOD AND APPARATUS FOR ANALYZING THE OPERATING CONDITION OF A MACHINE

[75] Inventor: David N. Schuh, Calgary, Canada

[73] Assignee: Beta Machinery Analysis Ltd., Calgary, Canada

[21] Appl. No.: 631,872

[22] Filed: Dec. 21, 1990

[51] Int. Cl.⁵ .............................................. F04B 21/08
[52] U.S. Cl. .......................................... 417/63; 417/53; 73/4 R
[58] Field of Search .................... 417/63, 53; 73/4 R, 73/37

[56] References Cited

U.S. PATENT DOCUMENTS 2,834,298  5/1958  Wright et al. ..................... 417/534
4,515,012  5/1985  Jenkins et al. ..................... 73/4 R
5,000,664  3/1991  Lawless et al. ..................... 417/63

Primary Examiner—Richard A. Bertsch
Assistant Examiner—Charles G. Freay
Attorney, Agent, or Firm—John Russell Uren

[57] ABSTRACT

A method and apparatus for analyzing the operating condition of a machine, such as a reciprocating compressor (10), is provided. The method comprises testing for fluid flow across the closed suction and discharge valves (30-33), as well as leakage across the piston (16), when the machine is in a non-operating condition. The test apparatus may be removable attached externally to the machine by connection to the Kiene head end indicator cock (22) and the crank end indicator cock (24) or the apparatus may be built in internally of the machine.

44 Claims, 5 Drawing Sheets

5,112,196

METHOD AND APPARATUS FOR ANALYZING THE OPERATING CONDITION OF A MACHINE

INTRODUCTION

This invention relates to a method and apparatus for analyzing the operating condition of a machine, such as a reciprocating compressor, which has a piston mounted for reciprocating movement in a cylinder and suction and discharge valves for controlling fluid flow between the interior and the exterior of the cylinder.

BACKGROUND OF THE INVENTION

In machines, such as reciprocating compressors, the health of the machine, i.e. the operating condition thereof, is largely determined by the condition of the valves and the piston rings.

In order to facilitate the analysis of the operating condition of a machine, it is an object of the invention to provide a method and apparatus by which tests for determining valve and piston ring condition can relatively easily be carried out. It is a further object of the invention to provide a machine which is adapted for carrying out such analysis without requiring the use of external equipment.

SUMMARY OF THE INVENTION

According to the invention, there is provided a machine, comprising a cylinder having a head end and a crank end, a piston mounted for reciprocating movement in the cylinder between the head end and the crank end, a valve movable between an open position and a closed position for controlling fluid flow between the interior and the exterior of the cylinder and means operative when the valve is in the closed position for measuring fluid flow across the valve.

Also according to the invention, there is provided a machine, comprising a cylinder having a head end and a crank end, a piston mounted for reciprocating movement in the cylinder between the head end and the crank end, a valve movable between an open position and a closed position for controlling fluid flow between the interior and the exterior of the cylinder and means, operative when the valve is in the closed position, for measuring fluid flow between the interior and the exterior of the cylinder.

Further according to the invention, there is provided a reciprocating compressor, comprising a cylinder having a head end and a crank end, a piston mounted for reciprocating movement in the cylinder between the head end and the crank end, a suction bottle connected to the interior of the cylinder through a suction manifold, a discharge bottle connected to the interior of the cylinder through a discharge manifold, a head end suction valve and a crank end suction valve for the inflow of fluid into the cylinder, a head end discharge valve and a crank end discharge valve for the outflow of fluid from the cylinder and means, operative when said suction valves and said discharge valves are closed, for measuring fluid flow between the interior and the exterior of the cylinder.

Also according to the invention, there is provided a method of analyzing the operating condition of a machine which has a cylinder having a head end and a crank end, a piston mounted for reciprocating movement in the cylinder between the head end and the crank end and a valve movable between an open position and a closed position for controlling fluid flow between the interior and the exterior of the cylinder, which method comprises the steps of placing the machine in an inoperative condition and measuring fluid flow across the valve with the valve in the closed position.

Further according to the invention, there is provided a method of analyzing the operating condition of a machine which has a cylinder having a head end and a crank end, a piston mounted for reciprocating movement in the cylinder between the head end and the crank end and a valve movable between an open position and a closed position for controlling fluid flow between the interior and the exterior of the cylinder, which method comprises the steps of placing the machine in an inoperative condition and measuring fluid flow between the interior and the exterior of the cylinder.

Also according to the invention, there is provided a method of analyzing the operating condition of a reciprocating compressor, which has a cylinder having a head end and a crank end, a piston mounted for reciprocating movement in the cylinder between the head end and the crank end, a suction bottle connected to the interior of the cylinder through a suction manifold, a discharge bottle connected to the interior of the cylinder through a discharge manifold, a head end suction valve and a crank end suction valve for the inflow of fluid into the cylinder and a head end discharge valve and a crank end discharge valve for the outflow of fluid from the cylinder, which comprises the steps of placing the compressor in an inoperative condition and measuring fluid flow between the interior and the exterior of the cylinder.

Further objects and advantages of the invention will become apparent from the description of a preferred embodiment of the invention below.

BRIEF DESCRIPTION OF THE DRAWINGS

The invention will now be described, by way of examples, with reference to the accompanying drawings, in which.

The apparatus used in carrying out the method according to one aspect of the invention comprises a high pressure flowmeter 9 and high pressure hoses 11 provided with "Kiene" connectors for connection to the head end and crank end indicator cocks which are conventionally provided on reciprocating compressor units. These hoses 11 and the flowmeter 9 are selected so that they are suitable for the highest pressures encountered in a compressor system, typically up to 1000 psig. Flow rates for healthy machines are expected to be low, i.e. in the region of 100 SCFH.

Figure 1:
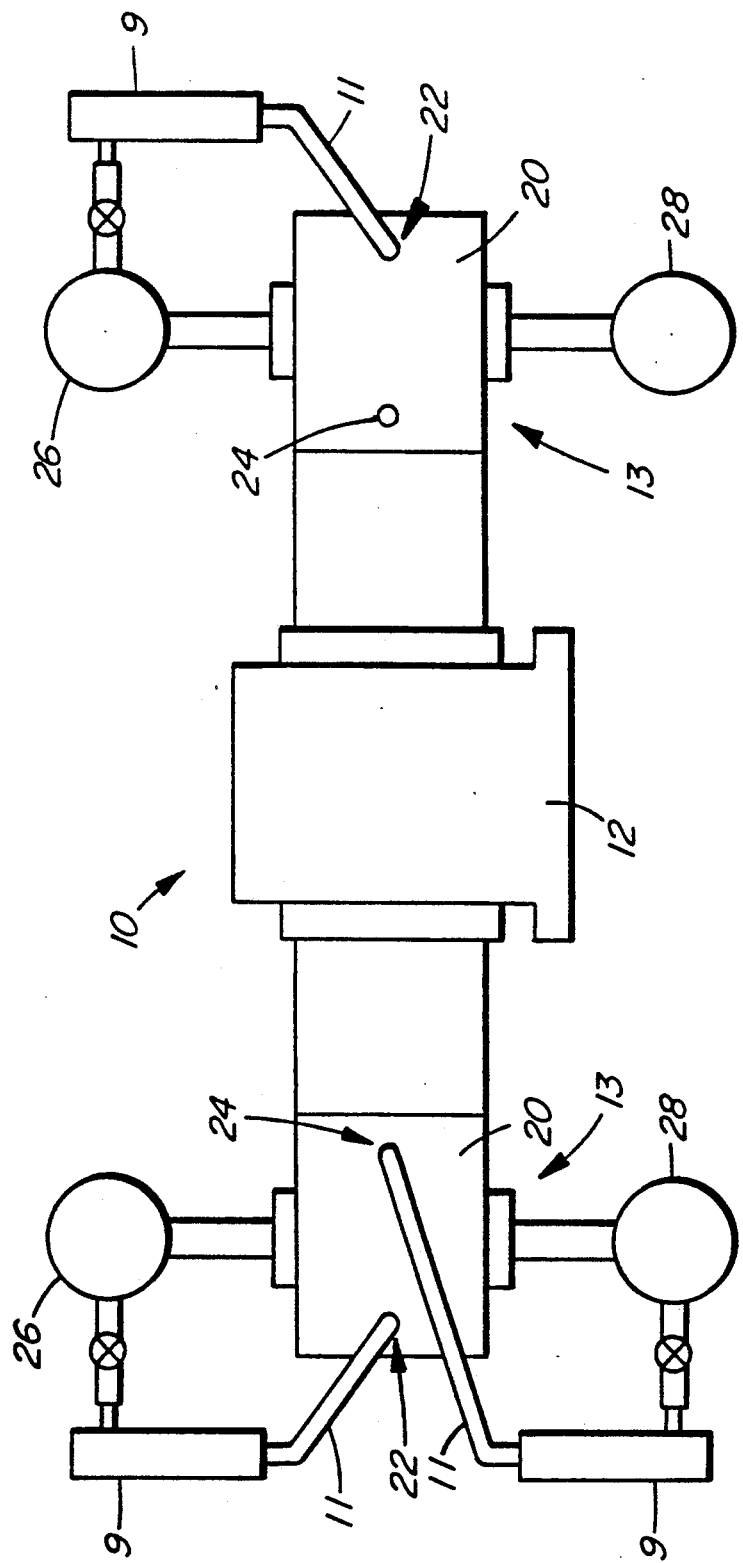
FIG. 1 is a schematical representation of a reciprocating compressor system to which the method and apparatus of the present invention are applied and showing apparatus for use in carrying out the method according to the invention in place on the compressor system.

With reference to FIG. 1, a compressor system is generally indicated at 10. The compressor system 10 comprises a main frame 12, connected to a plurality of compressor units, two of which are shown and generally indicated at 13 in FIG. 1. Although only two compressor units 13 are shown, it will be appreciated that any suitable number of compressor units 13 may be provided, as desired. For example, a plurality of compressor units 13 being employed in successive stages of compression may be employed, the discharge pressure of one stage representing the suction pressure of a next stage, etc.

Figure 2:
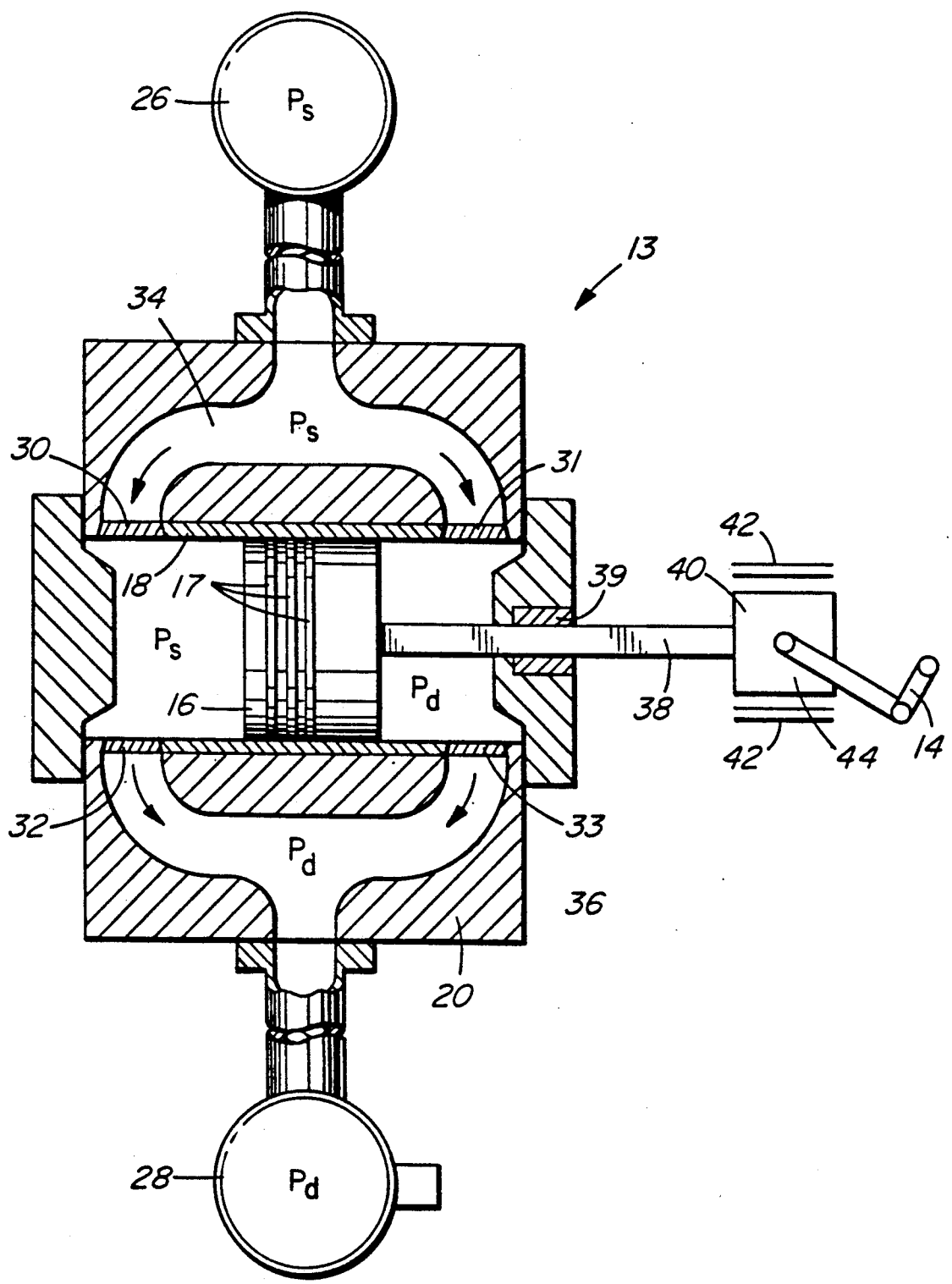
FIG. 2 is a schematical illustration showing a longitudinal section through a cylinder block of a compressor unit in the compressor system of FIG. 1.

A single compressor unit 13 is shown in FIG. 2. It comprises a cylinder block 20 which houses a piston 16 which is mounted for reciprocating movement in a cylinder 18. The main frame 12 (FIG. 1) houses a crankshaft 14 (FIG. 2) for driving the respective pistons 16 of the compressor units 13. Each piston 16 is provided with rings 17 to seal the gap between the piston 16 and the inner wall of its respective cylinder 18. Each cylinder block 20 has a standard Kiene head end indicator cock 22 and a crank end indicator cock 24. Each compressor unit 13 also has a suction bottle 26 and a discharge bottle 28.

In the remainder of this description reference will only be made to the single compressor unit 13, shown in FIG. 2, it being understood that the description applies equally to all the other compressor units 13 present in the compressor system 10.

A pair of suction valves 30 and 31 are provided on the suction side of the cylinder 18, the valve 30 being a head end suction valve and the valve 31 being a crank end suction valve. A head end discharge valve 32 and a crank end discharge valve 33 are, likewise, also provided. The suction and discharge valves 30 to 33 are check valves which only allow fluid to flow through them in the directions indicated by the arrows in FIG. 2.

The suction bottle 26 is connected to the head end and crank end suction valves 30, 31 through a suction manifold 34 and the discharge bottle 28 is connected to the head end and crank end discharge valves 32, 33 by means of a discharge manifold 36.

The piston 16 has a piston rod 38 which is connected to a crosshead 40 which is movable between guides 42 and connected to the crankshaft 14 by means of a connecting rod 44. Rod packing 39 is provided to provide a seal between the piston rod 38 and the cylinder block 20. When the crankshaft 14 is rotated, a reciprocating motion is imparted to the piston 16 in the cylinder 18 to pump fluid, such as air, from the suction side to the discharge side of the cylinder 18, thus to effect compression of the fluid.

The condition of a compressor unit 13 is largely reflected by the condition of the seal between the piston 16 and the cylinder inner wall, which is provided by the piston rings 17, as well as the condition of the suction and discharge valves 30 to 33.

To test the conditions of the above-mentioned parts, the invention provides that tests are carried out for fluid leakage past the piston rings 17, as well as for leakage of the suction and discharge valves 30 to 33.

To effect these tests, the compressor system 10 is stopped. In this condition, the suction bottle 26 and the suction manifold 34 will be at a suction pressure ($P_s$) of, say, about 300 psig, and the discharge bottle 28 and the discharge manifold 36 will be at a discharge pressure ($P_d$) of, say, about 1000 psig.

The tests are carried out in six steps which test for leakage of each of the four valves 30 to 33, as well as for piston ring leakage in both directions across the piston 16. In carrying out the tests, two flowmeters 9 and two sets of hoses 11 are conveniently used for the tests Nos. 3 to 6.

Test No. 1: Head End Discharge Valve Condition

In this test the head end of the cylinder 18 is vented to the suction bottle 26 by connecting the flowmeter 9 with the hoses 11 between the head end indicator cock 22 and the suction bottle 26. This connection is shown on the right hand side of FIG. 1. Thus, the head end will be at a pressure of $P_s$, as shown in FIG. 2. If there is no leakage through the head end discharge valve 32, there will be no fluid flow detected by the flowmeter 9, after an initial period during which the pressures between the cylinder head end and the suction bottle are equalized. However, if there is leakage back through the valve 32 from the cylinder discharge manifold (which is at a pressure of $P_d$) and the head end which is at the lower suction pressure ($P_s$), then the flowmeter 9 will detect a fluid flow, indicating that the valve 32 is leaking.

Test No. 2: Crank End Discharge Valve Condition

In this test, the cylinder crank end is vented to the suction bottle 26 by connecting the flowmeter 9 with the hoses 11, between the crank end indicator cock 24 and the bottle 26. Any flow of fluid which is measured after an initial pressure equalization period, will be an indication of leakage through the crank end discharge valve 33.

Test No. 3: Piston Ring Leakage from Head End

For this test the cylinder head end is pressurized with $P_d$ by connecting the discharge bottle 28 to the head end through the hoses 11 and one of the flowmeters 9. The cylinder crank end is then vented to the suction bottle 26 by connecting the second flowmeter 9 with hoses 11 between the crank end indicator cock 24 and the suction bottle 26. After an initial time to allow for the equalization of pressures, any flow measured by the second flowmeter 9 will be an indication of piston ring leakage from the head end to the crank end of the cylinder 18.

Test No. 4: Piston Ring Leakage from Crank End

For this test the crank end is pressurized with $P_d$ by connecting the discharge bottle 28 to the crank end through the one flowmeter 9 and hoses 11 and the head end is then vented to the suction bottle 26 by connecting the second flowmeter 9 with the hoses 11 between the head end indicator cock 22 and the suction bottle 26. These connections are shown on the left hand side of FIG. 1. Any flow measurement by the second flowmeter 9 will be an indication of piston ring leakage from the crank end to the head end of the cylinder 18.

Test No. 5: Head End Suction Valve Condition

For this test, the cylinder head end is pressurized with $P_d$ by connecting the discharge bottle 28 to the head end through the one flowmeter 9 and hoses 11. The suction bottle 26 is then vented to a lower stage suction or to atmosphere, i.e. to a pressure below $P_s$, through the second flowmeter 9 and hoses 11. Any flow measurement by the second flowmeter 9 will be an indication of leakage by the head end suction valve 30.

Test No. 6: Crank End Suction Valve Condition

For this test, the crank end is pressurized with $P_d$ by connecting the discharge bottle 28 to the crank end through the one flowmeter 9 and hoses 11. The suction bottle 26 is then vented to a lower stage suction or to atmosphere through the second flowmeter 9 and hoses 11. Any flow detected by the second flowmeter 9 will be an indication of leakage by the crank end suction valve 31.

By way of example, if flow rate measurements of 50, 40, 110, 120, 30 and 20 SCFN were obtained during the above-mentioned tests 1 to 6 respectively, this would indicate excessive leakage of the piston rings 17 in both directions.

In the tests Nos. 3 to 6 above, the purpose of the first flowmeter 9 is simply to test for equalization of pressure and it is not essential for carrying out the tests.

It will be appreciated that, in true life situations, the suction and discharge valves 30 to 33 each comprises a plurality of separate valves arranged in a circular configuration. Thus, an ultrasonic detector (not shown) may be used during the above tests to determine which of the several valves is responsible for the leakage. The rod packing 39 can be checked for leakage by flow rates forced out of the crosshead compartment (see below) or by ultrasonics.

In an alternative embodiment of the invention, the apparatus for carrying out the tests 1 to 6 above is built into a compressor unit, thus avoiding the use of external flowmeters and hoses. Such a compressor unit is shown at 50 in FIGS. 3 and 4. Parts of the unit 50 which are similar to the unit 13 are indicated by like reference numerals.

Figure 3:
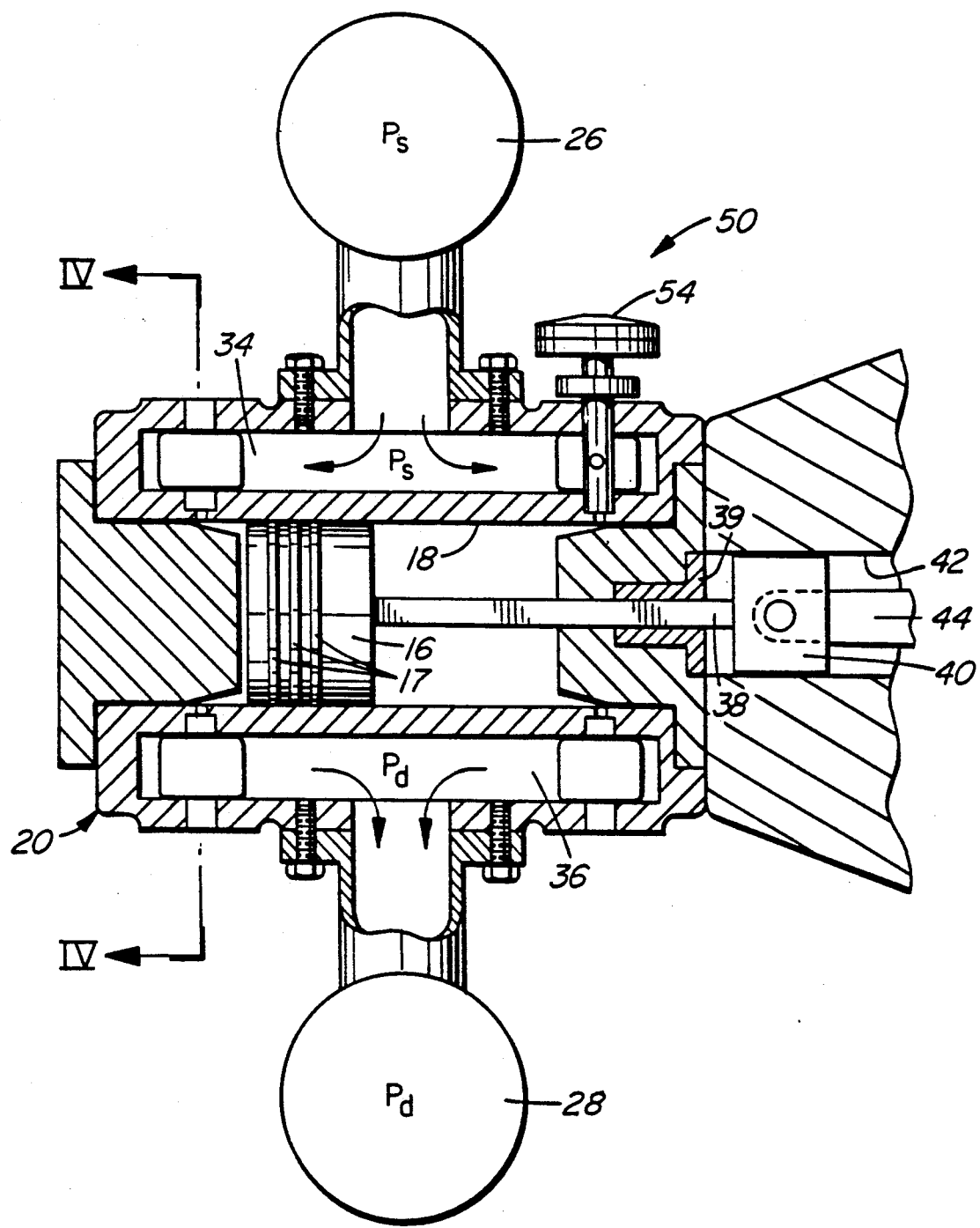
FIG. 3 is a view similar to that of FIG. 2 but showing an alternative embodiment of the invention wherein the testing apparatus is built into the compressor unit.
Figure 4:
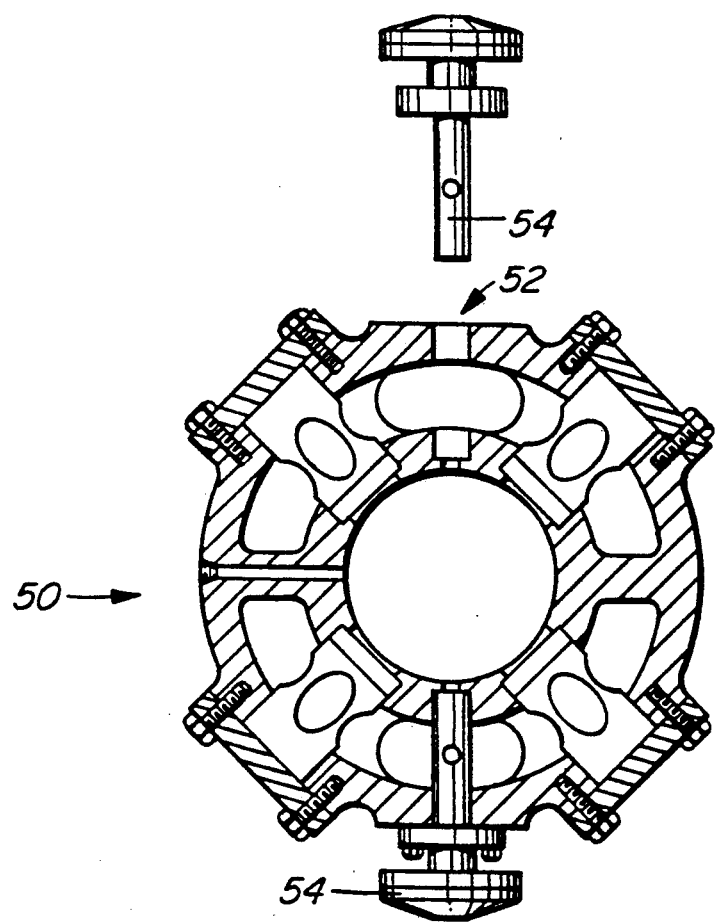
FIG. 4 is a cross section along the lines IV—IV in FIG. 3.

As shown in FIGS. 3 and 4, an extra port 52 is provided to house a built-in test apparatus 54. Four such test apparatuses 54 are provided for each cylinder 18, i.e. head end suction and discharge and crank end suction and discharge.

Figure 5:
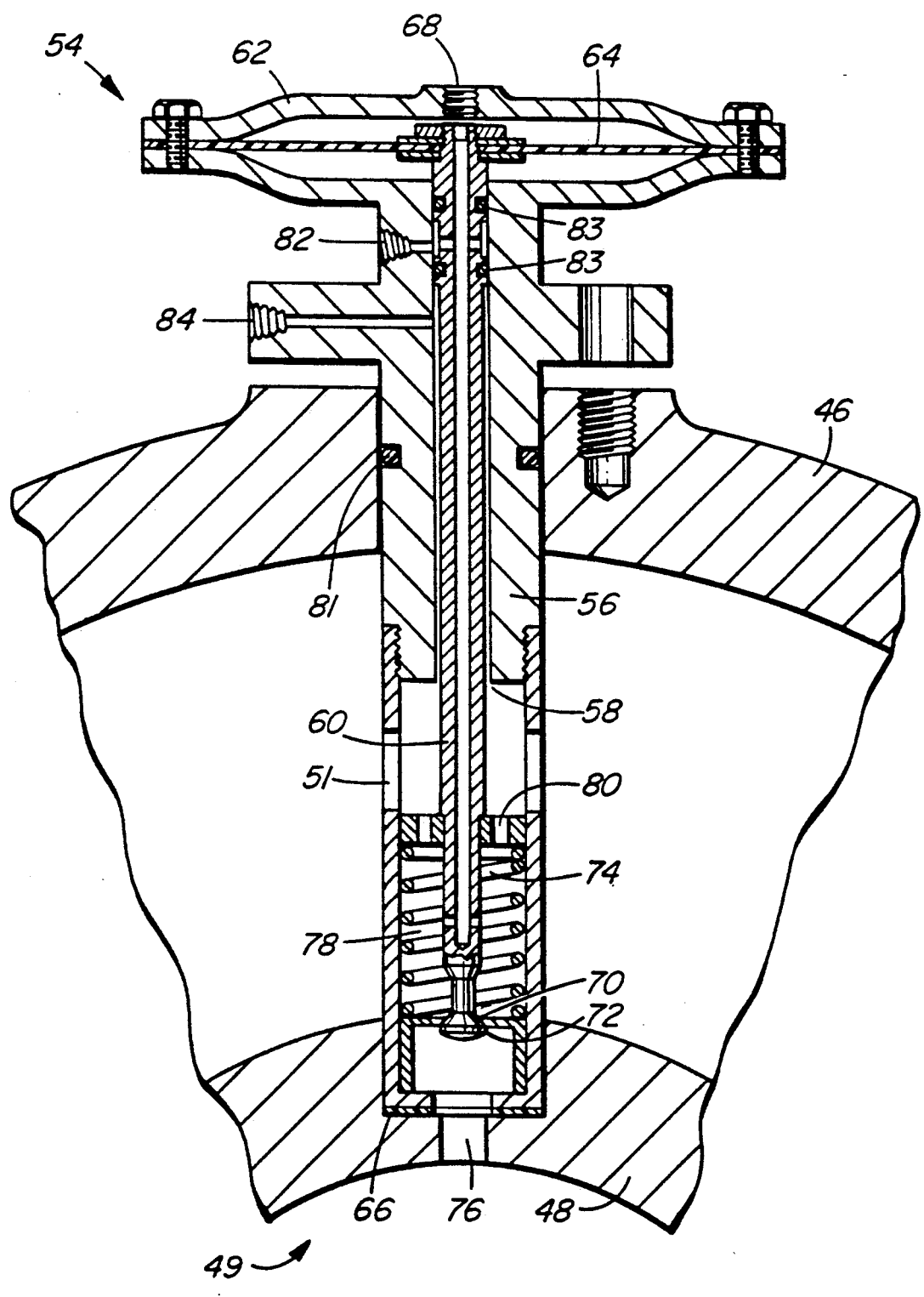
FIG. 5 is a longitudinal section, on a larger scale, of the built-in test apparatus.

The test apparatus 54 is shown on a larger scale and in more detail in FIG. 5. In this drawing reference numeral 46 denotes the outer casting and reference numeral 48 the inner casting of the compressor cylinder 18. The cylinder bore is indicated at 50. Reference numeral 51 indicates the gas passage between the inner and outer castings 46, 48.

The test apparatus 54 comprises a cylindrical body member 56 provided with a central bore 58 in which a valve stem 60 is located. A head portion 62 is provided at the upper end of the body member 56. The head portion 62 houses a diaphragm 64 and is provided with a pressure inlet port 68. A valve 70 is provided at the lower end of the stem 60. The valve 70 cooperates with a valve seat 72 to open and close the valve. The valve 70 is biased to a closed position by means of a spring 74. A connecting passage 76 is provided at the lower end of the body member 56 so that, when the valve 70 is open, fluid flow between the cylinder bore 50 and a chamber 78 in the lower portion of the body member 56 is possible.

A sealing gasket 66 is located at the lower end of the body member 56. Reference numerals 81 and 83 refer to O-rings for producing seals between the body member 56 and the outer casting 46 and the stem 60 and the body member 56, respectively.

An orifice 80 is provided in the chamber 78, and a pair of ports 82 and 84 are provided. The one port 82 is connected to the chamber 78 at a location below the orifice 80 and the port 84 is connected to the chamber 78 at a location above the orifice 80. A vent 85 is provided between the chamber 78 and the cylinder passages external to the cylinder bore 50. Depending on where the test apparatus 54 is located, the cylinder passages referred to above can be the passages in the suction manifold 34 or the passages in the discharge manifold 36.

OPERATION

In operation, the test apparatus 54 is activated by applying a pressure, such as 100 psi, to the inlet port 68. This urges the diaphragm 64 downwards and opens the valve 70. A fluid flow passage between the interior and the exterior of the cylinder bore 50 through the orifice 80 is, therefore, opened. By applying a pressure differential meter (not shown) between the ports 82 and 84, the pressure differential caused by any fluid flow through the orifice 80 can be obtained. This allows calculation of fluid flow across the orifice and thus, fluid flow between the interior and the exterior of the cylinder bore 50. This built-in apparatus, therefore, takes the place of the flowmeter 9 and hoses 11 used in the external apparatus.

To carry out Test No. 1, referred to above, the test apparatus 54, located in the head end suction side, is employed. By activating this test apparatus, the head end of the cylinder is vented to the suction bottle 26 through the vent 85.

To carry out Test No. 2, the crank end suction test apparatus will be activated.

To carry out Test No. 3, both the head end discharge test apparatus and the crank end suction test apparatus will be activated. This will result in the cylinder head end being pressurized to $P_d$ and the crank end being vented to the suction bottle 26.

To carry out Test No. 4, the crank end discharge test apparatus and the head end suction test apparatus are employed.

Finally, to carry out Tests Nos. 5 and 6, the head end discharge and crank end discharge test apparatuses are activated.

While only preferred embodiments of the invention have been described herein in detail, the invention is not limited thereby and modifications can be made within the scope of the attached claims.

What is claimed is:

1. A machine, comprising
   a piston mounted for reciprocating movement in a cylinder;
   a pressure activated valve movable between an open position and a closed position for controlling fluid flow between the interior and the exterior of the cylinder; and
   means operative when the valve is in the closed position for measuring fluid flow across the valve.

2. The machine according to claim 1, wherein said fluid flow measuring means is located externally of the machine and is detachable therefrom.

3. The machine according to claim 1, wherein said fluid flow measuring means is located internally of said machine.

4. The machine according to claim 3, wherein said fluid flow measuring means comprises a second valve located in a passage between the interior and the exterior of the cylinder, and means for measuring fluid flow through said passage when said second valve is open.

5. The machine according to claim 4, further comprising an orifice in said passage and wherein the means for measuring fluid flow through said passage comprises connection means to opposite sides of said orifice for measuring a pressure differential across said orifice.

6. A machine, comprising:
a piston mounted for reciprocating movement in a cylinder;
a pressure activated valve movable between an open position and a closed position for controlling fluid flow between the interior and the exterior of the cylinder; and
means operative when the valve is in the closed position for measuring fluid flow from the interior to the exterior of the cylinder.

7. The machine according to claim 6, wherein said fluid flow measuring means is located externally of the machine and is detachable therefrom.

8. The machine according to claim 6, wherein said fluid flow measuring means is located internally of said machine.

9. The machine according to claim 8, wherein said fluid flow measuring means comprises a second valve located in a passage between the interior and the exterior of the cylinder, and means for measuring fluid flow through said passage when said second valve is open.

10. The machine according to claim 9, further comprising an orifice in said passage, and wherein the means for measuring fluid flow through said passage comprises connection means to opposite sides of said orifice for measuring a pressure differential across said orifice.

11. The machine according to claim 10, wherein said second valve is biased to a closed position and further comprising means for opening said second valve from a location remote therefrom.

12. The machine according to claim 11, wherein said connection means comprises first and second ports for connection to a pressure difference meter, said ports, respectively, being in communication with locations on opposite sides of said orifice.

13. The machine according to claim 12, wherein said means for opening said second valve comprises a diaphragm operatively connected to said valve and a pressure inlet port for subjecting one side of said diaphragm to a pressure source.

14. The machine according to claim 1, further comprising means operative when the piston is in a stationary condition for measuring fluid flow across the piston between the head and crank ends.

15. The machine according to claim 14, wherein said means for measuring fluid flow across the piston comprises said means for measuring fluid flow between the interior and the exterior of the cylinder.

16. A reciprocating compressor, comprising:
a cylinder having a head end and a crank end;
a piston mounted for reciprocating movement in the cylinder between the head end and the crank end;
a suction bottle connected to the interior of the cylinder through a suction manifold;
a discharge bottle connected to the interior of the cylinder through a discharge manifold;
a head end suction valve and a crank end suction valve for the inflow of fluid into the cylinder;
a head end discharge valve and a crank end discharge valve for the outflow of fluid from the cylinder; and
means operative when said suction valves and said discharge valves are closed for measuring fluid flow from the interior to the exterior of the cylinder.

17. The compressor according to claim 16, wherein said fluid flow measuring means comprises means for connecting the head end of the cylinder to the suction bottle and means for measuring fluid flow between the head end and the suction bottle.

18. The compressor according to claim 17, wherein said fluid flow measuring means further comprises means for connecting the crank end to the suction bottle and means for measuring fluid flow between the crank end and the suction bottle.

19. The compressor according to claim 16, wherein said fluid flow measuring means comprises means for pressurizing the head end of the cylinder and means for connecting the suction bottle to a lower pressure and means for measuring fluid flow between the suction bottle and said lower pressure.

20. The compressor according to claim 19, wherein said means for pressurizing the head end of the cylinder comprises means for connecting the head end of the cylinder to the discharge bottle.

21. The compressor according to claim 20, wherein said measuring means further comprises means for pressurizing the crank end of the cylinder.

22. The compressor according to claim 21, wherein said means for pressurizing the crank end of the cylinder comprises means for connecting the crank end of the cylinder to the discharge bottle.

23. The compressor according to claim 16, wherein said fluid flow measuring means comprises a secondary valve associated with each of said head end suction, crank end suction, head end discharge and crank end discharge valves and operative between the interior of the cylinder and said suction and said discharge manifolds, respectively.

24. The compressor according to claim 23, wherein each of said secondary valves is located in a passage and including an orifice inset passage and connection means to opposite sides of said orifice for measuring a pressure differential across said orifice.

25. The compressor according to claim 24, wherein each of said secondary valves is biased to a closed position and further including means for opening each said second valve from a location remote therefrom.

26. The compressor according to claim 25, wherein said connection means comprises first and second ports for connection to a pressure difference meter, said ports, respectively, being in communication with locations on opposite sides of said orifice.

27. The compressor according to claim 26, wherein said means for opening said second valve comprises a diaphragm operatively connected to said valve and a pressure inlet port for subjecting one side of said diaphragm to a pressure source.

28. The compressor according to claim 16, further comprising means operative when the piston is in a stationary condition for measuring fluid flow across the piston.

29. The compressor according to claim 28, wherein said means for measuring fluid flow across the piston comprises means for pressurizing the head end of the cylinder and means for connecting the crank end of the cylinder to the suction bottle and means for measuring fluid flow between the crank end of the cylinder and the suction bottle.

30. The compressor according to claim 29, wherein said means for measuring fluid flow across the piston further comprises means for pressurizing the crank end of the cylinder and means for connecting the head end of the cylinder to the suction bottle and means for measuring fluid flow between the head end of the cylinder and the suction bottle.

31. A method of analyzing the operating condition of a machine which has a piston mounted for reciprocating movement in a cylinder and a pressure activated valve movable between an open position and a closed position for controlling fluid flow between the interior and the exterior of the cylinder, which method comprises the steps of placing the machine in an inoperative condition and measuring fluid flow across the valve with the valve in the closed position.

32. A method of analyzing the operating condition of a machine which has a piston mounted for reciprocating movement in a cylinder and a pressure activated valve movable between an open position and a closed position for controlling fluid flow between the interior and the exterior of the cylinder, which method comprises the steps of placing the machine in an inoperative condition and measuring fluid flow between the interior and the exterior of the cylinder with the valve in the closed position.

33. The method according to claim 32, further comprising the step of measuring fluid flow across the piston.

34. A method of analyzing the operating condition of a reciprocating compressor, which has a cylinder having a head end and a crank end, a piston mounted for reciprocating movement in the cylinder between the head end and the crank end, a suction bottle connected to the interior of the cylinder through a suction manifold, a discharge bottle connected to the interior of the cylinder through a discharge manifold, a head end suction valve and a crank end suction valve for the inflow of fluid into the cylinder, and a head end discharge valve and a crank end discharge valve for the outflow of fluid from the cylinder, which comprises the steps of placing the compressor in an inoperative condition and measuring fluid flow between the interior and the exterior of the cylinder.

35. The method according to claim 34, wherein said fluid flow is measured by connecting the head end of the cylinder to the suction bottle and measuring fluid flow between the head end and the suction bottle.

36. The method according to claim 35, wherein said fluid flow is further measured by connecting the crank end to the suction bottle and measuring fluid flow between the crank end and the suction bottle.

37. The method according to claim 34, wherein said fluid flow is measured by pressurizing the head end of the cylinder, connecting the suction bottle to a lower pressure and measuring fluid flow between the suction bottle and said lower pressure.

38. The method according to claim 37, wherein said pressurizing the head end comprises the step of connecting the head end to the discharge bottle.

39. The method according to claim 38, wherein said fluid flow is further measured by pressurizing the crank end of the cylinder and measuring fluid flow between the suction bottle and said lower pressure.

40. The method according to claim 34, further comprising the step of measuring fluid flow across the piston.

41. The method according to claim 40, wherein said measuring of fluid flow across the piston comprises the steps of pressurizing the head end of the cylinder, connecting the crank end of the cylinder to the suction bottle and measuring fluid flow between the crank end of the cylinder and the suction bottle.

42. The method according to claim 41, wherein said pressurizing the head end comprises the step of connecting the head end to the discharge bottle.

43. The method according to claim 41, wherein said measuring fluid flow across the piston further comprises the steps of pressurizing the crank end of the cylinder, connecting the head end of the cylinder to the suction bottle and measuring fluid flow between the head end of the cylinder and the suction bottle.

44. A machine, comprising:
a cylinder having a head end and a crank end;
a piston mounted for reciprocating movement in the cylinder between the head end and the crank end; and
means operative when the piston is in a stationary condition for measuring fluid flow across the piston between the head end and the crank end.

* * * * *